(12) United States Patent  
Roizen

(10) Patent No.: US 7,322,645 B2
(45) Date of Patent: Jan. 29, 2008

(54) BICYCLE SEAT RAIL CLAMPING SHAFTS AND MOUNTING SYSTEMS

(76) Inventor: Forrest L. Roizen, 1119 W. Lee St., #1, Boise, ID (US) 83702

( * ) Notice: Subject to any disclaimer, the term of this patent is extended or adjusted under 35 U.S.C. 154(b) by 232 days.

(21) Appl. No.: 10/954,500

(22) Filed: Sep. 29, 2004

(65) Prior Publication Data
US 2005/0067863 A1 Mar. 31, 2005

Related U.S. Application Data

(60) Provisional application No. 60/506,684, filed on Sep. 29, 2003.

(51) Int. Cl.
B62J 1/08 (2006.01)
B62J 1/00 (2006.01)

(52) U.S. Cl. .............. 297/215.15; 403/374.3; 403/385

(58) Field of Classification Search ............. 403/343, 403/384, 388, 374.2, 374.3; 297/195.1, 215.14, 297/215.15
See application file for complete search history.

(56) References Cited

U.S. PATENT DOCUMENTS

| | | | | |
|---|---|---|---|---|
| 4,275,922 A | * | 6/1981 | Juy | 297/215.14 |
| 4,421,357 A | * | 12/1983 | Shimano | 297/215.14 |
| D288,420 S | | 2/1987 | Juy | |
| 4,783,119 A | | 11/1988 | Moses | |
| 4,836,604 A | | 6/1989 | Romano | |
| 4,987,764 A | | 1/1991 | Chen | |
| 5,048,891 A | * | 9/1991 | Yach | 297/215.14 |
| 5,190,346 A | * | 3/1993 | Ringle | 297/215.14 |
| 5,244,301 A | * | 9/1993 | Kurke et al. | 403/390 |
| 5,295,727 A | * | 3/1994 | Kao | 297/215.14 |
| 5,383,706 A | * | 1/1995 | Chen | 297/215.15 |
| 5,466,042 A | * | 11/1995 | Herman | 297/215.15 |
| 5,509,751 A | * | 4/1996 | Keller | 403/235 |
| 5,547,155 A | | 8/1996 | Herting | |
| 5,722,718 A | * | 3/1998 | Still et al. | 297/215.15 |
| 6,174,027 B1 | | 1/2001 | Lemmens | |
| 2005/0225132 A1 | * | 10/2005 | Tisue | 297/195.1 |

* cited by examiner

Primary Examiner—Daniel P. Stodola
Assistant Examiner—Joshua T Kennedy
(74) Attorney, Agent, or Firm—Charles R. Clark

(57) ABSTRACT

An apparatus for attachment and adjustment of a bicycle seat is connected to a bicycle seat post and allows tool-free attachment of the seat to the post as well as angular fore and aft adjustment of the seat relative to the longitudinal axis of the seat post.

4 Claims, 4 Drawing Sheets

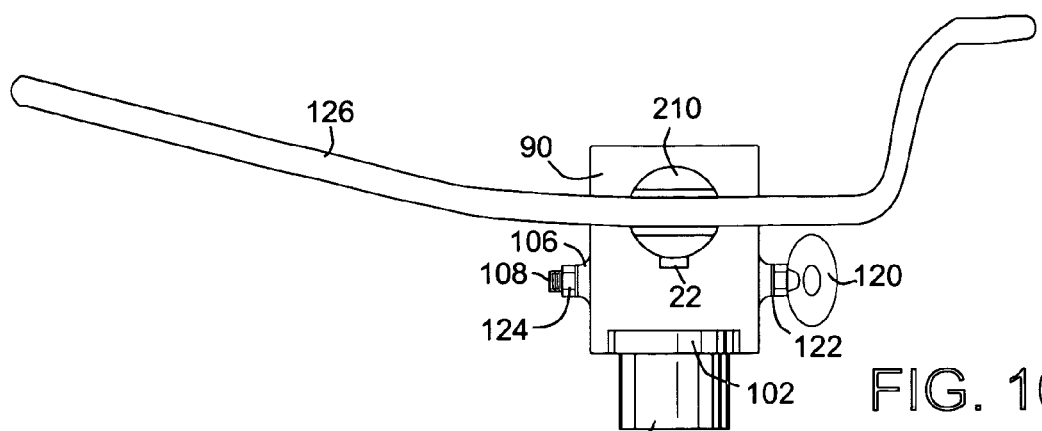
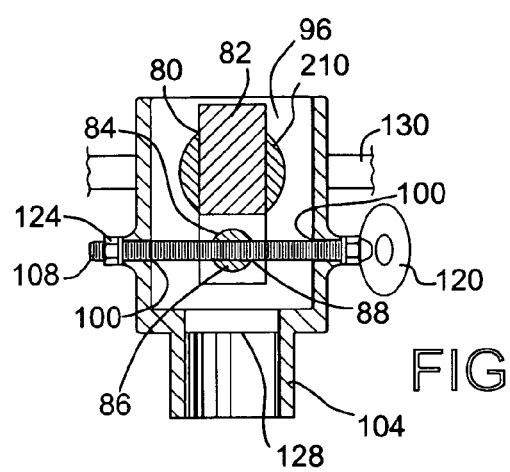
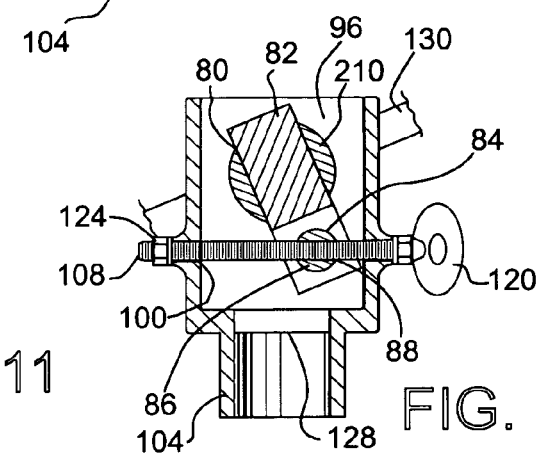
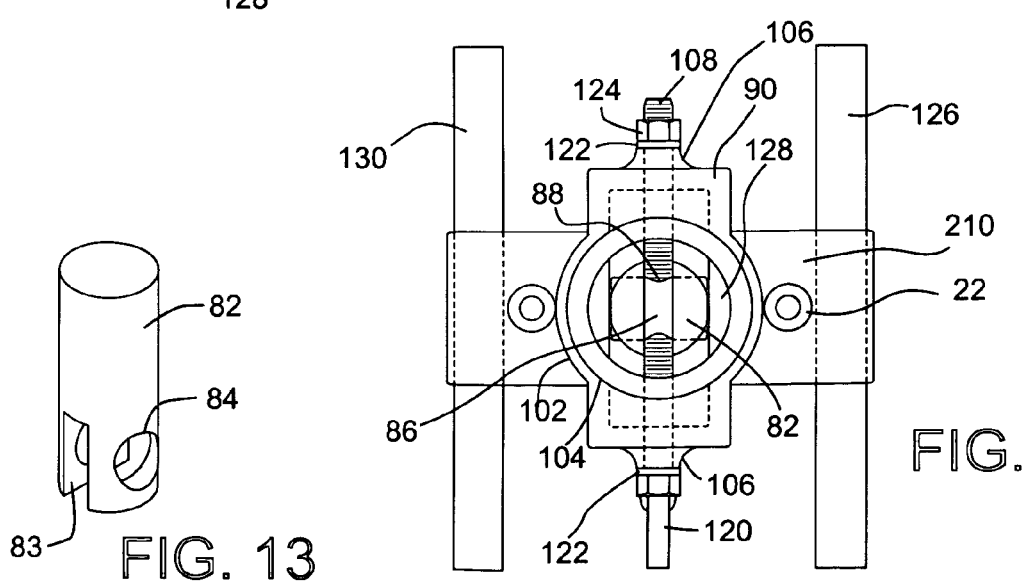

US 7,322,645 B2

BICYCLE SEAT RAIL CLAMPING SHAFTS AND MOUNTING SYSTEMS

CROSS-REFERENCE TO RELATED APPLICATIONS

This application claims the benefit of U.S. Provisional Application No. 60/506,684, filed Sep. 29, 2003.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention relates to bicycles and teaches several novel bicycle seat rail clamping shafts and mounting systems for attachment and adjustment of a two seat rail bicycle seat and each system allows easy attachment of the seat to a bicycle seat post and the easy adjustment of the fore and aft position and the angulation of the bicycle seat with both adjustments relative to the longitudinal axis of the seat post connected to the bicycle seat rail clamping shaft.

BRIEF SUMMARY OF THE INVENTION

An objective of this invention, a bicycle seat rail clamping shaft and a bicycle seat mounting system, is to provide a novel and improved system for use with a two seat rail bicycle seat that allows a bicycle seat user to more easily adjust by hand the fore and aft seat position and the angular orientation of the two seat rail bicycle seat relative to its bicycle seat post than allowed by prior art. In the preferred embodiment, a user can even adjust the seat while riding.

Ergonometric advantages for a bicycle rider are promoted because in the preferred embodiment of the instant bicycle seat rail clamping shaft invention, the rider can easily make adjustments by hand without tools to the fore and aft positioning and angular orientation of his seat while away from his workshop and without recourse to a toolbox and its array of wrenches or the need to carry a toolkit while riding.

The invention helps a bicycle rider safeguard his back and body from injury that in the absence of the invention might be caused by riding a bicycle with a seat that is not adjusted properly to the rider or for the rider's needs. The invention permits a plurality of riders who may ride a specific bicycle to each adjust the seat to fit themselves.

The systems preferably and principally are made out of an aluminum alloy such as 7005 or 7075 together with appropriate mechanical fittings such as bolts, nuts, and washers. Stainless steel, titanium, or other suitable materials could be substituted in place of an aluminum alloy without departing from the intended scope of the invention.

Additional and various other objects and advantages attained by the invention will become more apparent as the specification is read and the accompanying figures are reviewed.

BRIEF DESCRIPTION OF THE SEVERAL VIEWS OF THE DRAWINGS

FIG. 10 is a side plan view of the third mounting system shown in FIG. 9 also showing a left seat rail 126 mounted to the bicycle seat rail clamping shaft 210;

FIG. 11 is a side sectional view of the third mounting system shown in FIG. 10 and also showing a mid-range angular position of the sliding shaft 82 and the attached right seat rail 130;

FIG. 12 is a side sectional view of the third mounting system shown in FIG. 10 and also showing an end-range angular position of the sliding shaft 82 and the attached right seat rail 130;

FIG. 13 is a perspective view of a sliding shaft 82;

FIG. 14 is a bottom plan view of the third mounting system shown in FIG. 10 and also showing a left seat rail 126 and a right seat rail 130 mounted to the bicycle seat rail clamping shaft 210;

DETAILED DESCRIPTION OF THE INVENTION

Referring to FIGS. 1 through 16, a bicycle commonly is equipped with a bicycle seat having two spaced and roughly parallel seat rails 126 and 130, see FIG. 14, that are also generally fore and aft relative to the bicycle longitudinal axis.

The present invention is a bicycle seat rail clamping shaft 10 that receives the two seat rails 126 and 130, see for example FIG. 14, and securely and removably grips the rails and provides an interfacing and cooperating member to a mounting system with said system in turn secured to a seat post tube.

Figure 1:
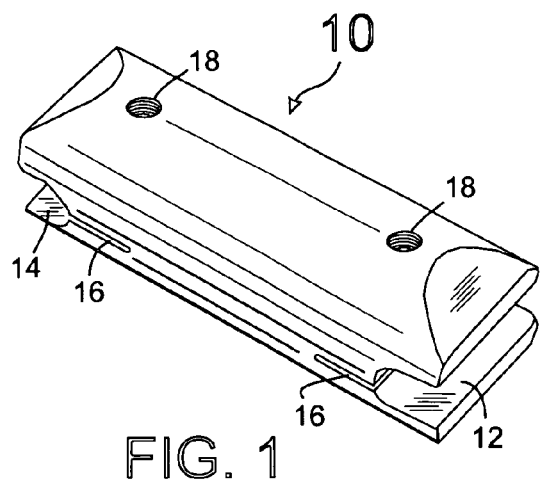
FIG. 1 is a perspective view of a bicycle seat rail clamping shaft 10 for receiving and securing a two seat rail bicycle seat.
Figure 2:
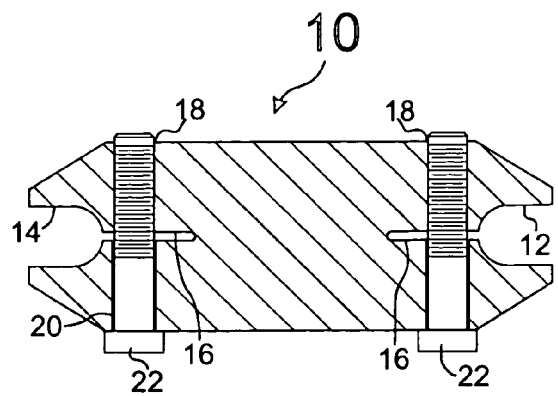
FIG. 2 is a side sectional view of the bicycle seat rail clamping shaft 10.

FIG. 1 shows a bicycle seat rail clamping shaft 10. The bicycle seat rail clamping shaft 10 is a generally cylindrical one-piece shaft having two seat rail slots, a left seat rail slot 12 transverse to the longitudinal axis of the clamping shaft near one end of the clamping shaft, a right seat rail slot 14 spaced and parallel to the left seat rail slot 12 at the opposite end of the shaft, two compression slots 16, two pairs of compression bolt bores 18 and 20 (see FIG. 2) that are coaxial and transverse to the shaft axis, and two compression bolts 22. Each pair of compression bolt bores (see FIG. 2) comprises an upper threaded compression bolt bore 18 and a coaxial lower unthreaded compression bolt bore 20 and each pair of compression bores crosses a compression slot 16 that commences within a respective rail slot 12 and 14 and proceeds inwardly along the longitudinal axis of the shaft and partially towards the opposite rail slot. Each pair of compression bolt bores 18 and 20 receives a compression bolt 22 that is introduced first into the lower unthreaded compression bolt bore 20 and then into the upper threaded compression bolt bore 18. The compression bolts 22 when tightened squeeze the compression slots 16 together and thereby squeeze each rail slots 12 and 14 respectively together.

The bicycle seat rail clamping shaft 10 is used in several mounting systems (see FIGS. 3 to 16) for attaching the seat to a seat post and each system is used for adjusting the fore and aft seat position and the angulation of the bicycle seat relative to the longitudinal axis of the bicycle seat post for both adjustments.

Figure 3:
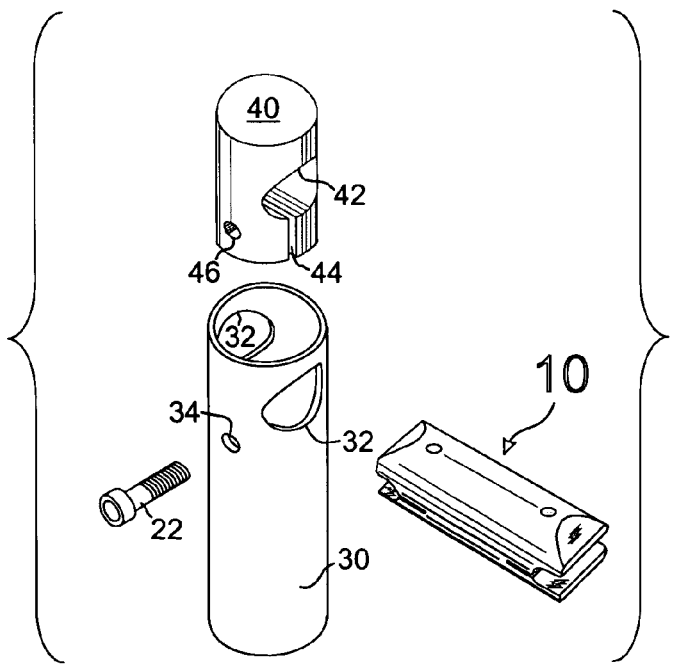
FIG. 3 is an exploded perspective view of a first mounting system incorporating the bicycle seat rail clamping shaft 10.

FIG. 3 is an exploded perspective view of a first mounting system incorporating the bicycle seat rail clamping shaft 10. The seat post tube 30 has a pair of seat post tube transverse coaxial bores 32 near its upper end and a seat post tube compression bolt bore 34 below the coaxial bores and perpendicular to the axis of the coaxial bores. A seat post tube pinch clamp plug 40 has a seat post tube pinch clamp plug transverse receiving bore 42 near its upper end that is appropriately sized to a bicycle seat rail clamping shaft 10 that will be inserted into the receiving bore, a seat post tube pinch clamp plug compression slot 44 that longitudinally splits the bore at the lower end of the plug, a seat post tube pinch clamp plug unthreaded compression bolt bore 46, and a seat post tube pinch clamp plug threaded compression bolt bore 48. The compression bolt bores 46 and 48 are coaxial and cross the plug compression slot 44. The plug 40 is inserted into the top of the seat post tube 30 and the transverse bores of the post tube and the plug are aligned and the bicycle seat rail clamping shaft 10 is inserted into the transverse bores and positioned with preferably equal portions extending outward on either side of the seat post tube. A compression bolt 22 is inserted into the seat post tube compression bolt bore 34 and the coaxial bores 46 and 48 and is tightened and thereby reduces the effective circumference of the transverse receiving bore 42 and securely grips the bicycle seat rail clamping shaft 10. The compression bolt can later be loosened and the clamping shaft can be rotated within the receiving bore as desired.

Figure 4:
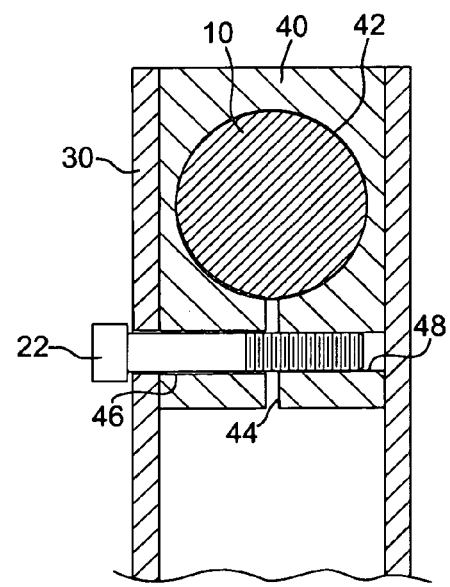
FIG. 4 is a partial side sectional view of the first mounting system shown in FIG. 3.
Figure 5:
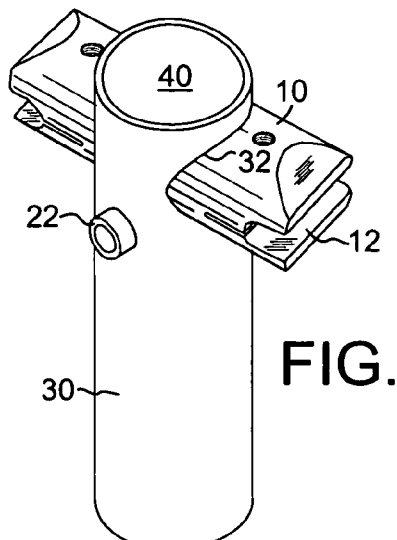
FIG. 5 is an assembled perspective view of the first mounting system shown in FIG. 3.

FIG. 4 is a partial side sectional view of the first mounting system shown in FIG. 3 and discussed in the paragraph immediately above. FIG. 4 illustrates the cooperating relationships between the elements of the first mounting system. FIG. 5 is an assembled perspective view of the first mounting system.

Figure 6:
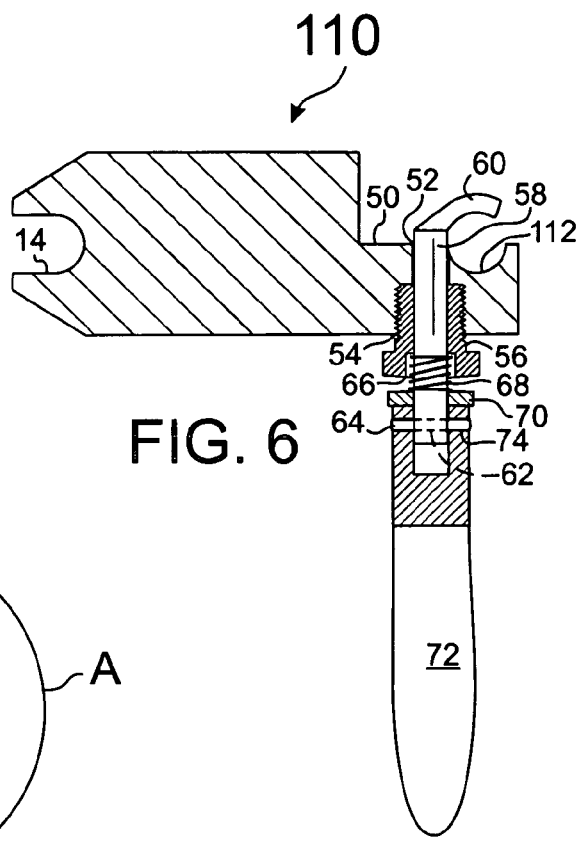
FIG. 6 is a side sectional view of a second embodiment of a bicycle seat rail clamping shaft 110.

FIG. 6 is a side sectional view of a second embodiment of a bicycle seat rail clamping shaft 110 that provides easier usage than the first embodiment because the compression slots and compression bolts are omitted and a quick release type mechanism is used to close and secure an alternative left seat rail slot 112 and to grip a left seat rail 126. The length of the seat rail slots 14 and 112 provide stability to seat rails that are placed within them and clamped in slot 112 after the quick release type mechanism is closed. Preferably the rail slot 112 is placed transverse to the clamping shaft 110 as shown in FIG. 6 so that its bottom is in the same plane as the lower surface of the right rail slot 14. Shaft 110 has a bicycle seat rail clamping shaft flat 50 that is in a plane spaced and parallel to the lower plane of the rail slots 14 and 112. The shaft 110 has a J-bolt bore 52 that is perpendicular to the flat 50 and preferably intersects the longitudinal axis of the shaft 110 and the J-bolt bore is located very near to the top edge of the slot 112 and longitudinally between the right rail slot 14 and the slot 112. Preferably, a threaded adjustment fitting bore 54 is formed coaxially to the J-bolt bore 52 and from the surface of the shaft away from the flat 50 and linearly and adjustably receives from the surface away from the flat an adjustment fitting 56 into the fitting bore. The adjustment fitting 56 has an axial bore that is the same diameter as the J-bolt bore 52. A J-bolt 58 is received first down into the J-bolt bore 52 and then into and extending through the adjustment fitting 56 as shown in FIG. 6. The J-bolt 58 has a J-bolt clamping tab 60 formed at the end that extends upward and above the flat 50 that preferably is formed to closely fit over a portion of a seat rail that is placed in the rail slot 112. The J-bolt 58 has a transverse J-bolt retaining pin bore 62 at the end opposite the clamping tab 60. Preferably, the adjustment fitting 56 has a coaxial spiral spring bore 66 at its lower end that may receive a spiral spring 68 that when received encircles the shaft of the J-bolt 58 and then a concave washer 70 is received over the J-bolt shaft to cooperate with a cam handle 72 that has a cam handle retaining pin bore 74 that is coaxially aligned about the J-bolt retaining pin bore 62 at the lower end of the J-bolt 58 before a J-bolt retaining pin 64 is inserted to secure the quick release mechanism together. After the cam handle 72 is secured to the J-bolt 58, the handle can be used to control the action of the clamping tab 60.

Figure 7:
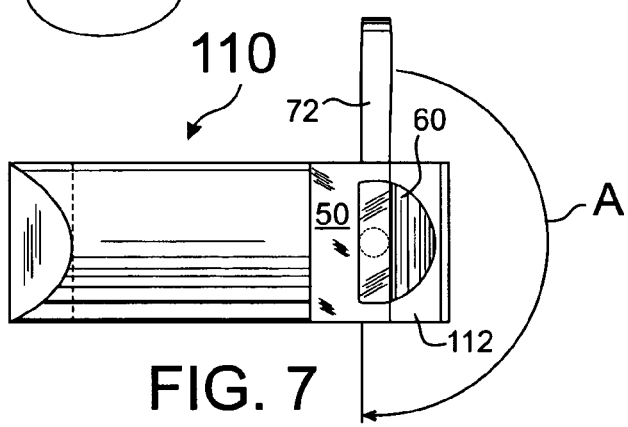
FIG. 7 is a top plan view of the second embodiment of the bicycle seat rail clamping shaft 110.

FIG. 7 is a top plan view of the second embodiment of the bicycle seat rail clamping shaft 110 that shows with arrow A the allowable rotation of the cam handle 72 about the axis of the J-bolt 58 and the coupled rotation of J-bolt clamping tab 60 from a position covering the left seat rail slot 112 to a position uncovering the slot (the uncovering position is not shown).

Figure 8:
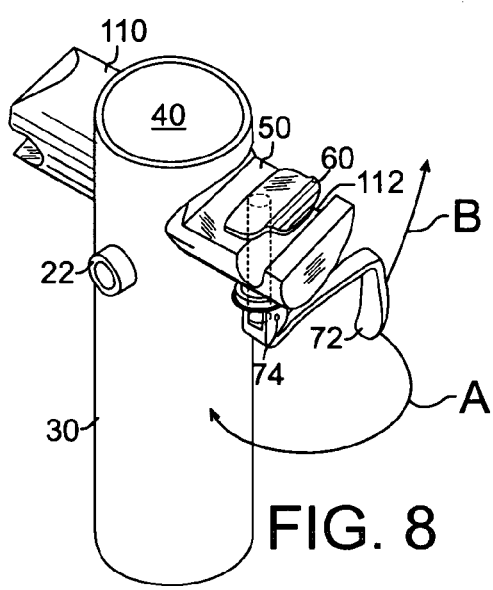
FIG. 8 is an assembled perspective view of a second mounting system incorporating the bicycle seat rail clamping shaft 110 in the place of the bicycle seat rail clamping shaft 10 in the first mounting system.

FIG. 8 is an assembled perspective view of a second mounting system incorporating the bicycle seat rail clamping shaft 110 in the place of the bicycle seat rail clamping shaft 10 in the first mounting system. In FIG. 8, arrow A shows the allowable rotation of the cam handle 72 about the axis of the J-bolt 58 and the coupled rotation of J-bolt clamping tab 60 from a position covering the left seat rail slot 112 to a position uncovering the slot (the uncovering position is not shown) and arrow B indicates a permissible direction of upward movement of the cam handle 72 that will cause clamping tab 60 to clamp down to a closed position.

Figure 9:
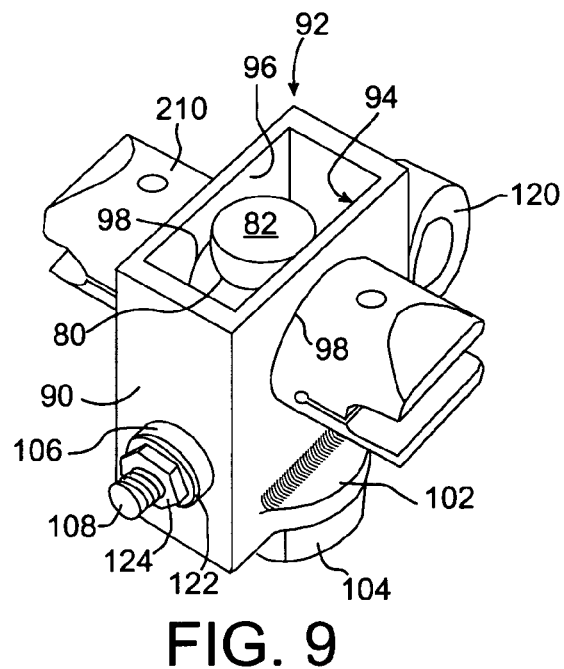
FIG. 9 is a perspective view of a third mounting system incorporating a third embodiment of a bicycle seat rail clamping shaft 210.

FIG. 9 is a perspective view of a third mounting system incorporating a third embodiment of a bicycle seat rail clamping shaft 210 that differs from the shaft 10 in that it has a transverse sliding shaft bore 80 near the longitudinal midpoint of the shaft 210 that is not present in shaft 10. The sliding shaft bore 80, is sized to slidingly receive within it a sliding shaft 82. The sliding shaft 82 has a sliding shaft transverse receiving bore 84 near its lower end to receive and rotatably retain a sliding shaft pivot pin 86. The sliding shaft pivot pin 86 has a threaded sliding shaft pivot pin bore 88 that is transverse at or near the pivot pin's longitudinal midpoint and threaded to receive an angular adjustment screw 108.

The third mounting system uses a head shell assembly 90 that has a head shell interior cavity 92 that is preferably a rectangularly shaped hollow cube. The head shell interior cavity 92 has two spaced and parallel inside head shell walls 94 and 96 that near their upper edges are perpendicularly intersected by two head shell transverse coaxial bores 98 that are sized to receive and rotatably retain within them a bicycle seat rail clamping shaft 210.

The head shell assembly 90 includes two head shell angular adjustment screw coaxial bores 100 that are in the head shell assembly below the head shell transverse coaxial bores 98 and perpendicular to the axis of the coaxial bores 98 that are sized to receive and rotatably retain an angular adjustment screw 108 that extends through them.

FIGS. 9 and 10 show a flared portion 102 at the lower end of the head shell assembly 90 near a male coupling portion 104; the coupling portion can be fixed in the top of an appropriately sized hollow seat post tube.

FIG. 10 is a side plan view of the third mounting system shown in FIG. 9 and also shows a left seat rail 126 mounted to the bicycle seat rail clamping shaft 210. Preferably, reinforcing bosses 106 surround the head shell angular adjustment screw coaxial bores 100.

FIG. 11 is a side sectional view of the third mounting system shown in FIG. 10 and also shows a mid-range angular position of the sliding shaft 82 and the attached right seat rail 130. The angular adjustment screw 108 preferably has a knob 120 at one end that can be turned by hand or alternatively an alien head or other bolt head could be used. FIG. 11 shows the angular adjustment screw 108 passing through the head shell angular adjustment screw coaxial bores 100 and retained in the bores by a lock nut 124 or other suitable device at the other end from the knob 120. FIGS. 11 and 12 clearly show the angular adjustment screw 108 passing through the threaded sliding shaft pivot pin bore 88 and illustrate by the two positions shown how rotation of the screw is changed into a linear translation of the sliding shaft pivot pin 86 along the axis of the screw and an angular rotation of the bicycle seat rail clamping shaft 210 that benefits from the mechanical advantages brought to bear by the system. The sliding shaft 82 slides in or out of the sliding shaft bore 80 as the screw is rotated and the sliding shaft pivot pin 86 moves along the screw.

FIG. 12 is a side sectional view of the third mounting system shown in FIG. 10 and also shows an end-range angular position of the sliding shaft 82 and the attached right seat rail 130.

FIG. 13 is a perspective view of a sliding shaft 82 and shows an angular adjustment screw slot 83 at the bottom of the sliding shaft that extends partially upwards along the axis of the sliding shaft towards its opposite end. FIG. 13 also shows a sliding shaft transverse receiving bore 84 that preferably is perpendicular to the plane of the screw slot 83.

FIG. 14 is a bottom plan view of the third mounting system shown in FIG. 10 and also shows a left seat rail 126 and a right seat rail 130 mounted to the bicycle seat rail clamping shaft 210. FIG. 14 also shows an interior flat 128 surface located within the hollow male coupling portion 104 and shows how access is available through an opening into the head shell cavity 92 (see FIG. 9).

Washers 122 are used in the various mounting systems in a conventional manner.

Figure 15:
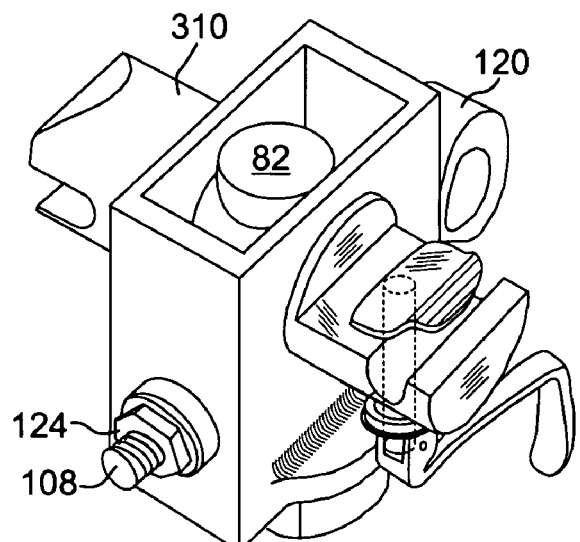
FIG. 15 is a perspective view of a fourth mounting system incorporating a fourth embodiment of a bicycle seat rail clamping shaft 310.

FIG. 15 is a perspective view of a fourth mounting system incorporating a fourth embodiment of a bicycle seat rail clamping shaft 310 that differs from the shaft 110 in that it has a transverse sliding shaft bore 80 near the longitudinal midpoint of the shaft 310 that is not present in shaft 110. The sliding shaft bore 80, is sized to slidingly receive within it a sliding shaft 82. The sliding shaft 82 has a sliding shaft transverse receiving bore 84 near its lower end to receive and rotatably retain a sliding shaft pivot pin 86. The sliding shaft pivot pin 86 has a threaded sliding shaft pivot pin bore 88 that is transverse at or near the pivot pin's longitudinal midpoint and threaded to receive an angular adjustment screw 108.

Figure 16:
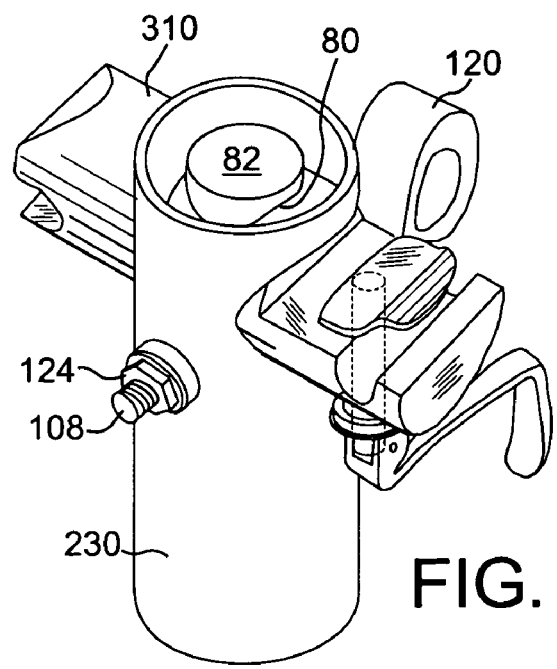
FIG. 16 is a perspective view of a fifth mounting system incorporating a hollow seat post tube 230 in the place of the head shell assembly 90.

FIG. 16 is a perspective view of a fifth mounting system incorporating a hollow seat post tube 230 in the place of the head shell assembly 90.

The preceding description and exposition of the invention is presented for purposes of illustration and enabling disclosure. It is neither intended to be exhaustive nor to limit the invention to the precise forms disclosed. Modifications or variations in the invention in light of the above teachings that are obvious to one of ordinary skill in the art are considered within the scope of the invention as determined by the appended claims when interpreted to the breath to which they fairly, legitimately and equitably are entitled.

I claim:

1. A bicycle seat mounting system comprising
a bicycle seat rail clamping shaft comprising a generally cylindrical shaft having a left seat rail slot transverse to the longitudinal axis of said clamping shaft near one end of said clamping shaft and a right seat rail slot spaced and parallel to said left seat rail slot at the opposite end of said shaft, said cylindrical shaft having a transverse sliding shaft bore near the longitudinal midpoint of said shaft and said sliding shaft bore sized to slidingly receive within it a sliding shaft, said sliding shaft having a sliding shaft transverse receiving bore near its lower end to receive and rotatably retain a sliding shaft pivot pin, said sliding shaft pivot pin having a threaded sliding shaft pivot pin bore transverse at or near said pivot pin's longitudinal midpoint and threaded to receive an angular adjustment screw, said sliding shaft having an angular adjustment screw slot at the bottom of said sliding shaft that extends partially upwards along the axis of said sliding shaft towards its opposite end, said sliding shaft transverse receiving bore is perpendicular to the plane of said screw slot, a head shell assembly having a head shell interior cavity, said head shell interior cavity having two spaced and parallel inside head shell walls that near their upper edges are perpendicularly intersected by two head shell transverse coaxial bores sized to receive and rotatably retain within them said bicycle seat rail clamping shaft, said head shell assembly including two head shell angular adjustment screw coaxial bores below said head shell transverse coaxial bores and perpendicular to the axis of said coaxial bores that are sized to receive and rotatably retain said angular adjustment screw that extends through them, said angular adjustment screw having a knob at one end, said angular adjustment screw passing through said head shell angular adjustment screw coaxial bores and said threaded sliding shaft pivot pin bore and retained in said head shell angular adjustment screw coaxial bores by a lock nut at the other end of said screw from said knob, and a flared portion at the lower end of said head shell assembly near a male coupling portion.

2. A bicycle seat rail clamping shaft according to claim 1 further comprising
two compression slots commencing within said respective rail slots and proceeding inwardly along the longitudinal axis of said shaft and partially towards said opposite rail slot, two pairs of compression bolt bores that are coaxial and transverse to said shaft axis, each said pair of compression bolt bores comprising an upper threaded compression bolt bore and a coaxial lower unthreaded compression bolt bore, each said pair of compression bores crossing one of said compression slots, and each said pair of compression bolt bores receiving a compression bolt.

3. A bicycle seat rail clamping shaft according to claim 1 further comprising a quick release type mechanism to close and secure said left seat rail slot.

4. A bicycle seat rail clamping shaft according to claim 1 further comprising
- a bicycle seat rail clamping shaft flat in a plane spaced and parallel to the lower plane of said rail slots,
- a J-bolt bore perpendicular to said flat and preferably intersecting the longitudinal axis of said shaft and said J-bolt bore located near to the top edge of said left rail slot and longitudinally between said right rail slot and said left rail slot,
- a threaded adjustment fitting bore formed coaxially to said J-bolt bore and from the surface of said shaft away from said flat and linearly and adjustably receiving from the surface away from said flat an adjustment fitting into said fitting bore, said adjustment fitting having an axial bore,
- a J-bolt is received down into said J-bolt bore and then into and extending through said adjustment fitting, said J-bolt having a J-bolt clamping tab formed at the end that extends upward and above said flat and formed to closely fit over a portion of a seat rail that is placed in said rail slot, said J-bolt having a transverse J-bolt retaining pin bore at the end opposite said clamping tab, a concave washer is received over said J-bolt shaft to cooperate with a cam handle having a cam handle retaining pin bore that is coaxially aligned about said J-bolt retaining pin bore before a J-bolt retaining pin is inserted.

* * * * *